United States Patent
Haas et al.

(12) 
(10) Patent No.: US 6,733,699 B1
(45) Date of Patent: May 11, 2004

(54) METHOD FOR PRODUCING NUCLEAR FUEL PELLETS OF THE MOX TYPE

(75) Inventors: Didier Haas, Weingarten (DE); Claude Fuchs, Niederlauterbach (FR); Serge Fourcaudot, Karlsruhe (DE); François Charollais, Linkenheim (DE); Joseph Somers, Karlsruhe (DE)

(73) Assignee: European Community (EC), Luxembourg (LU)

( * ) Notice: Subject to any disclaimer, the term of this patent is extended or adjusted under 35 U.S.C. 154(b) by 78 days.

(21) Appl. No.: 10/031,407

(22) PCT Filed: Aug. 17, 2000

(86) PCT No.: PCT/EP00/08057

§ 371 (c)(1),
(2), (4) Date: Jan. 18, 2002

(87) PCT Pub. No.: WO01/18822

PCT Pub. Date: Mar. 15, 2001

(30) Foreign Application Priority Data

Sep. 6, 1999 (EP) .............................................. 99116886

(51) Int. Cl.$^7$ ............................................... G21C 21/00
(52) U.S. Cl. ........................ 264/0.5; 423/260; 423/261
(58) Field of Search .......................... 264/0.5; 423/260, 423/261

(56) References Cited

U.S. PATENT DOCUMENTS

| | | | |
|---|---|---|---|
| 4,202,793 A | 5/1980 | Bezzi et al. | |
| 4,382,885 A | 5/1983 | Haas | |
| 4,384,990 A | 5/1983 | Hein | |
| 4,571,315 A | 2/1986 | Gerontopoulos et al. | |
| 5,841,200 A | * 11/1998 | Bauer et al. | ................. 264/0.5 |

FOREIGN PATENT DOCUMENTS

| | | |
|---|---|---|
| EP | 1 020 873 A1 | 7/2000 |
| FR | 2 622 343 | 10/1987 |
| GB | 1 480 427 | 10/1974 |

OTHER PUBLICATIONS

International Search Report PCT EP 00/08057 Dec. 7, 2000.
Haas, Didier et al., "Mox Fuel Fabrication and In–Reactor Performance", Proc. of the International Conference on Future Nuclear Systems, Global 97, p. 489–494, XP–000869930.

* cited by examiner

Primary Examiner—Christopher A. Fiorilla
(74) Attorney, Agent, or Firm—Sughrue Mion, PLLC

(57) ABSTRACT

A method for producing mixed oxide nuclear fuel pellets comprises the steps of preparing an U-Pu oxide blend powder having a Pu content in excess of the finally desired value, preparing uranium oxide powder, mixing adequate quantities of both powders in order to achieve the desired plutonium content and compacting and sintering the mixture for obtaining the pellets. The step of preparing the uranium oxide powder involves the following sequence of substeps: a) preparing an aqueous solution of uranyl nitrate to which between 0.5 and 2 wt % of organic thickeners are added such that the viscosity of the solution is adjusted to values between 20 and 100 centipoise, b) dispersing of the solution into droplets, c) introducing the droplets into a hydroxide bath, d) washing the resulting beads, e) drying the beads by azeotropic distillation using an immiscible organic solvent, f) thermally treating the beads in an oxidizing atmosphere and g) thermally treating in a reducing atmosphere.

11 Claims, No Drawings

METHOD FOR PRODUCING NUCLEAR FUEL PELLETS OF THE MOX TYPE

This application is a 371 of PCT/EP00/08057 filed Aug. 17, 2000.

This invention refers to a method for producing nuclear fuel pellets of the MOX (=mixed oxide) type, comprising the steps of preparing an U-Pu oxide blend powder having a Pu content in excess of the finally desired value, preparing an uranium oxide powder, mixing adequate quantities of both powders in order to achieve the desired plutonium content, compacting and sintering the mixture for obtaining said pellets.

Such a method is known under the term MIMAS ("MIcronized MASter Blend"—see for example D. Haas, M. Lippens "MOX FUEL FABRICATION AND IN-REACTOR PERFORMANCE", Proc. of the Internat. Conference on Future Nuclear Systems, GLOBAL 97, p.489 à 494). This separate preparation of a powder free of plutonium reduces the volume of plutonium containing powder that has to be milled, and allows the production of fuel pellets of various plutonium contents with a unique plutonium treatment chain by changing only the rate of admixed uranium powder.

The commercial powders currently used, however, result in a final product which is heterogeneous, i.e. contains large particles rich in plutonium oxide dispersed within an uranium oxide matrix whose grain size is below 10 $\mu$m. This heterogeneity leads to two major drawbacks:

During irradiation localised higher fissile material concentrations lead to high local burnups, to fission damages and to gas release. To limit this gas release large $UO_2$ grains are recommended, provided that they are produced without additives that might lead to detrimental fuel behaviour during irradiation and might also lead to difficulties during reprocessing.

During reprocessing the dissolution of the burned-up fuel in nitric acid is hindered by regions rich in plutonium, which is notoriously insoluble.

The present invention aims to overcome these drawbacks and to propose a method as indicated above which leads to fuel pellets of the MOX type in which the distribution of plutonium throughout the pellet is substantially more homogeneous.

This aim is achieved by the method as defined in claim 1. As far as preferred embodiments of this method are concerned, reference is made to the secondary claims.

The invention will now be described in detail by means of preferred embodiments.

In agreement with the known MIMAS method as cited above, the method according to the invention implies the separate preparation of a Pu-U oxide powder on the one hand and an uranium oxide powder free of plutonium on the other hand.

According to a first embodiment the Pu-U oxide powder is prepared conventionally by mechanically milling $PuO_2$ and $UO_2$ materials, whereas the $UO_2$ powder is prepared as follows:

To an aqueous solution of uranyl nitrate small amounts, i.e. between 0.5 and 2 wt %, of organic thickeners are added, such as METHOCEL (a water soluble cellulose polymer), dextran, polyvinyl alcohol, such that the viscosity of the solution is adjusted to values between 20 and 100 centipoise. There-after, this solution is dispersed into droplets, which are introduced into an ammonia bath. In this bath, due to the network formed by the long chain organic polymers, precipitation occurs within the original droplets, so that nearly spherical beads are formed. The size of these beads depends on the size of the droplets produced during dispersion. In a preferred embodiment these beads present diameters of between 20 and 50 $\mu$m. These beads are then washed to remove nitrate salts (ammonium nitrate salts in the above example) and organic polymers, and are subjected to an azeotropic distillation using an immiscible organic solvent such as $C_2Cl_4$ to remove water.

Once dried the beads are in a hydroxide form, from which they are converted to oxide by a thermal treatment of between 2 and 6 hours duration and at about 400° C. in air. Thereby residual organic polymers are pyrolysed. The beads are then again submitted to a thermal treatment of between 4 and 8 hours duration, this time at about 800° C. and in a reducing atmosphere of Ar/5%$H_2$, to convert $U_3O_8$ to $UO_2$.

The beads can be produced by conventional uranium processing facilities (no α contamination). They are free flowing, dust free and do not require any further mechanical treatment such as milling prior to mixing with the powder containing plutonium. The homogeneity of the finally produced fuel can further be enhanced by sieving the beads and retaining only beads with diameters in the range of 20 to 50 $\mu$m. Alternatively this result can also be achieved by using a droplet dispersion device which produces droplets of well defined size such that the bead diameters remain within said range and no sieving becomes necessary.

Once mixed the MOX powder is compacted into pellets by using a press which applies a pressure of between 200 and 600 MPa. These pellets are then sintered at high temperature, preferably at 1700° C., in a humidified Ar/$H_2$ atmosphere, the hydrogen content of which lies between 1 and 6% and the water vapour introduction should result in a ratio of the partial $H_2$ pressure to the water vapour partial pressure of between 20 and 60. The water allows to control the oxygen potential of the gas atmosphere which results in an enhanced diffusion and in a more homogeneous fuel thus enabling a longer burn-up in the reactor.

According to a variant of the method the powder containing an excess content of plutonium can be prepared in the same way as above described for the uranium oxide powder, but by starting with uranyl-plutonium nitrate instead of uranyl nitrate.

The inventive method can be realised in conventional MOX fabrication facilities and conserves all the advantages of the MIMAS process but does not suffer from the drawbacks of this process as mentioned above.

What is claimed is:

1. A method for producing mixed oxide nuclear fuel pellets comprising the steps of preparing an U-Pu oxide blend powder having a Pu content in excess of the finally desired value, preparing a uranium oxide powder, mixing adequate quantities of both powders in order to achieve the desired plutonium content, compacting and sintering the mixture for obtaining said pellets, wherein the step of preparing the uranium oxide powder involves the following sequence of substeps:

a) preparing an aqueous solution of uranyl nitrate to which between 0.5 and 2 wt % of organic thickeners are added such that the viscosity of the solution is adjusted to values between 20 and 100 centipoise, b) dispersing the solution into droplets, c) introducing said droplets into a hydroxide bath, d) washing the resulting beads, e) drying the beads by azeotropic distillation using an immiscible organic solvent, f) thermally treating the beads in an oxidising atmosphere, g) thermally treating in a reducing atmosphere.

2. A The method according to claim 1, wherein the step of preparing an U-Pu oxide blend powder consists in milling and mixing adequate quantities of uranium oxide and plutonium oxide.

3. The method according to claim 1, wherein the step of preparing the U-Pu oxide blend powder involves the following sequence of substeps:

a) preparing an aqueous solution of uranyl-plutonium nitrate to which small amounts of organic thickeners are added in order to adjust the viscosity of the solution to values between 20 and 100 centipoise, b) dispersing of the solution into droplets, c) introducing said droplets into a hydroxide bath, d) washing the resulting beads, e) subjecting the beads to an azeotropic distillation using an immiscible organic solvent, f) thermally treating the beads in an oxidising atmosphere, g) thermally treating in a reducing atmosphere.

4. The method according to claim 1 or 3, wherein in substep a) the organic thickeners are selected among water-soluble cellulose polymer, dextran and polyvinyl alcohol.

5. The method according claims claim 1 or 3, wherein in substep c) the hydroxide bath consists of ammonia.

6. The method according to claim 1 or 3, wherein in substep f) the thermally treating in an oxidising atmosphere is performed at about 400° C. and in air.

7. The method according to claim 1 or 3, wherein in substep g) the thermally treating in a reducing atmosphere is performed at about 800° C., the reducing atmosphere containing an inert gas with a hydrogen content between 1 and 6%.

8. The method according to claim 1, wherein compacting of the powder mixture into pellets is obtained by applying a pressure of between 200 and 600 MPa.

9. The method according to claim 1, wherein the sintering of the pellets takes place at a temperature above 1200° C., and in a humidified $Ar/H_2$ atmosphere, the hydrogen content lying between 1% and 6% and the ratio between the partial pressures of hydrogen and water vapour being selected between 20 and 60.

10. The method according to claim 9, wherein the sintering of the pellets takes place at a temperature between 1600 and 1700° C.

11. A The method according to claim 1, wherein before mixing adequate quantities of both powders, the $UO_2$-powder is sieved in order to retain only beads with diameters between 20 and 50 $\mu$m size.

* * * * *